United States Patent [19]
Willner et al.

[11] 3,818,321
[45] June 18, 1974

[54] VOLTAGE REGULATOR

[75] Inventors: Kurt Willner, Los Angeles; Maurice M. Lavamaki, Lomita, both of Calif.

[73] Assignee: Wilorco, Inc., Long Beach, Calif.

[22] Filed: Apr. 9, 1973

[21] Appl. No.: 349,201

[52] U.S. Cl. ............................................. 323/43.5 S
[51] Int. Cl. .................................................. G05f 1/20
[58] Field of Search............ 323/43.5 S, 22 SC, 24, 323/47; 317/31, 33 R

[56] References Cited
UNITED STATES PATENTS
3,599,040 8/1971 Ebersohl......................... 323/43.5 S
3,619,765 11/1971 Wood............................. 323/43.5 S

*Primary Examiner*—Gerald Goldberg
*Attorney, Agent, or Firm*—Lindenberg, Freilich & Wasserman

[57] ABSTRACT

AC and DC voltage regulators are disclosed in which in each, the output voltage $V_{out}$ is related to $V_{in} \times T_s/T_p$, wherein $V_{in}$ is the unregulated input voltage and $T_s$ and $T_p$ are the number of turns of windings of an isolation transformer or the number of turns of different portions of the winding of an autotransformer. Either $T_s$ or $T_p$ is varied in discrete steps in order to control the product of $V_{in}$ and $T_s/T_p$ to be within a preselected range. The output voltage $V_{out}$ in the DC voltage regulator is compared with fixed reference voltages, which define the desired regulation range of the output voltage, to provide a 2-bit code, used to control the incrementing or decrementing of an up-down counter. $T_s$ or $T_p$ is controlled, based on the count in the counter. In an AC regulator, the AC output voltage is converted into a related DC control voltage which is compared with the reference voltages.

20 Claims, 9 Drawing Figures

| COUNT$^R$ STATE | COUNT$^R$ O/PUT $2^0$ $2^1$ $2^2$ $2^3$ | ACTIVATED SWITCHES |||||||||||| WINDINGS IN SERIES ACROSS TERMINALS | N$^o$ OF WINDINGS |
|---|---|---|---|---|---|---|---|---|---|---|---|---|---|---|
| | | Z1 | Z2 | Z3 | Z4 | Z5 | Z6 | Z7 | Z8 | Z9 | Z10 | Z11 | | |
| 0 | 0 0 0 0 | | | | C | | | | | | | | P1 | 100 |
| 1 | 1 0 0 0 | | | | | | C | | | | | | P1 + P2 | 102 |
| 2 | 0 1 0 0 | C | | | | | | | C | | | | P1 + P3 | 104 |
| 3 | 1 1 0 0 | | | | | | C | | C | | | | P1 + P2 + P3 | 106 |
| 4 | 0 0 1 0 | C | C | | | | | | | | C | | P1 + P4 | 108 |
| 5 | 1 0 1 0 | | C | | | | C | | | | C | | P1 + P2 + P4 | 110 |
| 6 | 0 1 1 0 | C | | | | | | C | | | C | | P1 + P3 + P4 | 112 |
| 7 | 1 1 1 0 | | | | | | C | C | | | C | | P1 + P2 + P3 + P4 | 114 |
| 8 | 0 0 0 1 | C | C | C | | | | | | | | C | P1 + P5 | 116 |
| 9 | 1 0 0 1 | | C | C | | C | | | | | | C | P1 + P2 + P5 | 118 |
| 10 | 0 1 0 1 | C | | C | | | | | C | | | C | P1 + P3 + P5 | 120 |
| 11 | 1 1 0 1 | | | C | | C | | | C | | | C | P1 + P2 + P3 + P5 | 122 |
| 12 | 0 0 1 1 | C | C | | | | | | | C | | C | P1 + P4 + P5 | 124 |
| 13 | 1 0 1 1 | | C | | | | C | | | C | | C | P1 + P2 + P4 + P5 | 126 |
| 14 | 0 1 1 1 | C | | | | | | C | | C | | C | P1 + P3 + P4 + P5 | 128 |
| 15 | 1 1 1 1 | | | | | C | | C | | C | | C | P1 + P2 + P3 + P4 + P5 | 130 | ns

VOLTAGE REGULATOR

BACKGROUND OF THE INVENTION

1. Field of the Invention

The present invention generally relates to voltage regulators and, more particularly, to improved regulators in which AC or DC voltage regulation is accomplished without distortion and at high efficiency.

2. Description of the Prior Art

Herebefore AC voltage regulation has been accomplished generally by either of two methods. In one method, phase control is employed by allowing only a selected portion of each half cycle of an AC voltage, produced in response to an input voltage, to pass through a control element such as a siliconcontrolled rectifier (SCR). Filtering is then employed to produce the desired regulated sinusoidal AC output voltage. Such a method in essence is an analog control method in which the duty cycle is controlled in a continuous fashion. Its primary disadvantages are extreme waveform distortion, generation of relatively high EMI levels and reduced efficiency.

In another known voltage regulation method, a servo control technique is employed. Therein a rotating autotransformer is tapped, by turning the shaft holding the tapping brush. This method is also an analog control method in that the voltage level is controlled in a continuous fashion. Its primary drawbacks are the requirements of mechanical moving parts which are subject to wear out and therefore to potential failure. Also, the method exhibits a slow response time to load or line transients.

OBJECTS AND SUMMARY OF THE INVENTION

It is a primary object of the present invention to provide a new voltage regulator which is free of the disadvantages of prior art regulators.

Another object of the present invention is to provide highly reliable AC or DC voltage regulators in which regulation is accomplished by a new method.

A further object of the invention is to provide highly reliable yet relatively simple AC or DC voltage regulators in which regulation is achieved without moving parts, without any significant waveform distortion and without generating undesirable EMI.

These and other objects of the invention are achieved by providing a regulator including a transformer (or autotransformer) with a plurality of taps. A separate switch is connected in series with each tap. The outputs of all the tap-switches are connected together at a first common terminal. A second terminal is connected to the end of the transformer winding along which the taps are spaced. The number of winding turns between the two terminals is controlled by controlling the closure of only one of the switches in a digital fashion. Each tap-switch position corresponds to a particular count in a digital counter. The desired regulated voltage is used as a control voltage which is compared with reference voltages defining the regulation range. The comparison results are used in discrete steps to control the count in the counter and thereby control the closure of a particular switch so that the control voltage is between the reference voltage which occurs only when the regulated voltage is within the desired range. Switching is synchronized with the line frequency to occur when the voltage across the switches is a minimum thereby preventing any EM interference from being generated. The regulation response time corresponds to one cycle of the line frequency.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
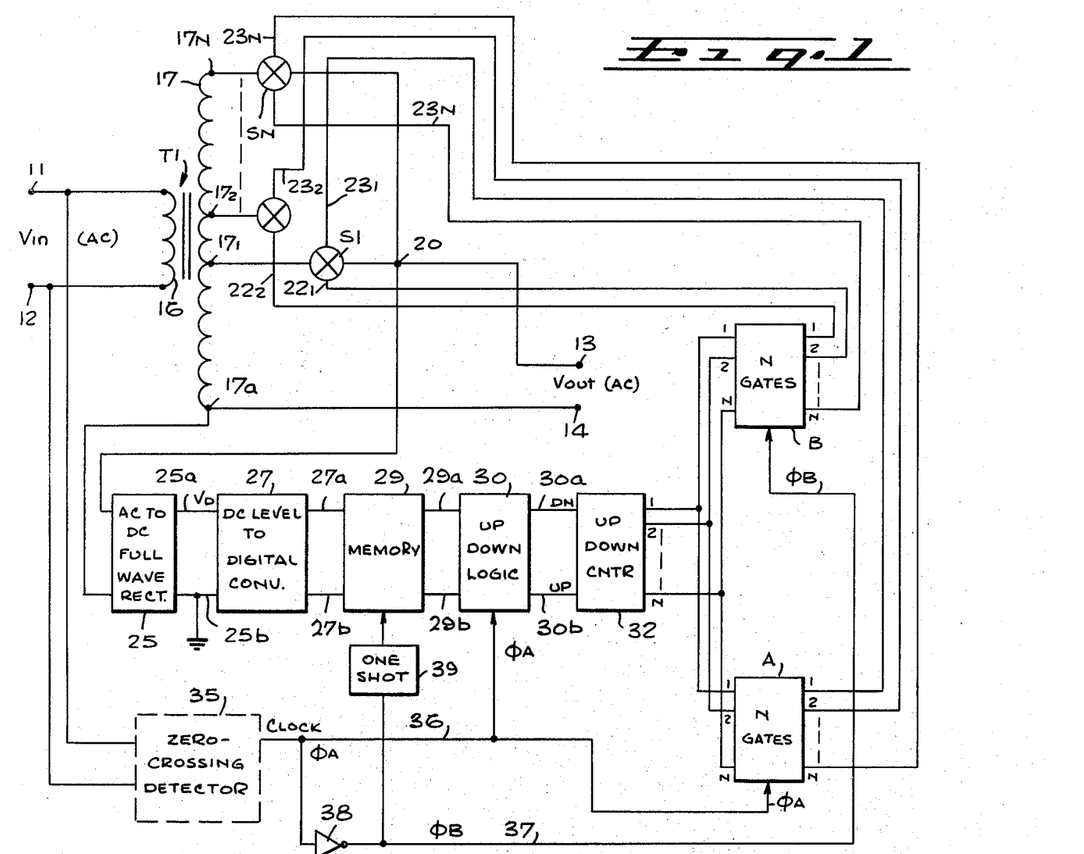
FIG. 1 is a block diagram useful in explaining the basic principles of the present invention in connection with one embodiment.
Figure 2:
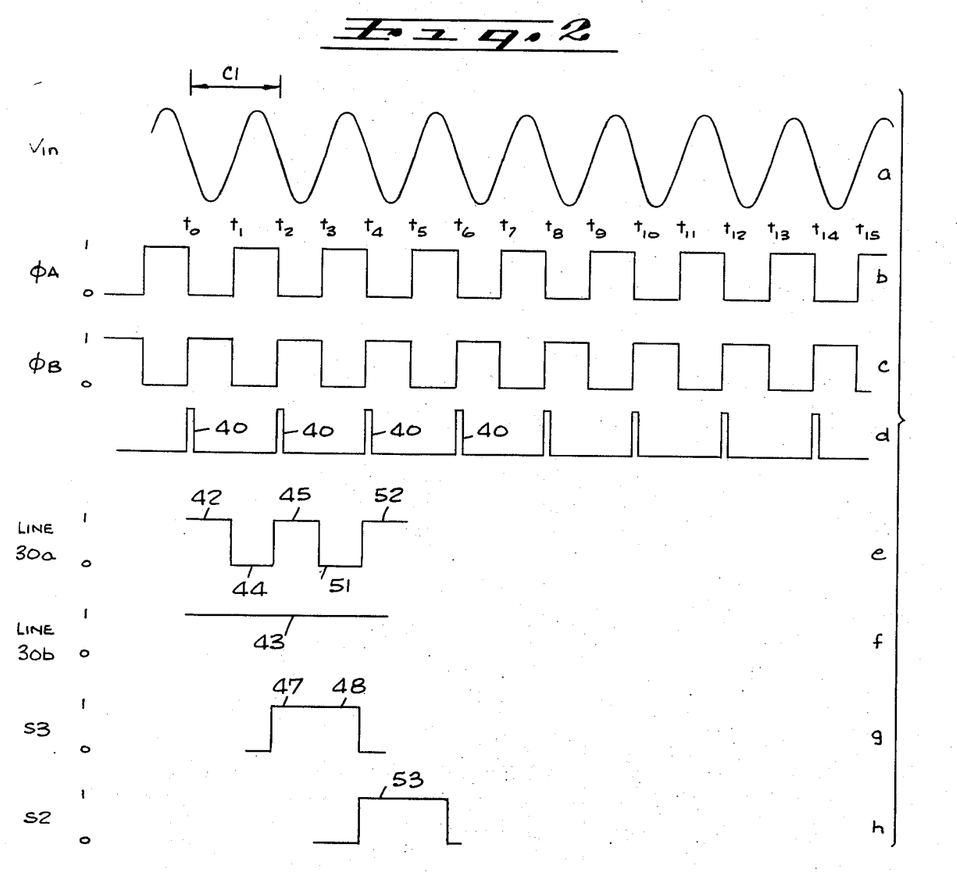
FIG. 2 is a multiline waveform diagram useful in explaining the embodiment of FIG. 1.

Attention is now directed to FIGS. 1 and 2 in connection with which a basic embodiment of the invention will be described. In FIG. 1, numerals 11 and 12 designate one pair of terminals. For explanatory purposes, terminals 11 and 12 are assumed to be input terminals across which an unregulated AC input voltage, designated $V_{in}$, is applied, while terminals 13 and 14 designate output terminals across which a regulated AC output voltage, designated $V_{out}$, is to be provided. For explanatory purposes, let it be assumed that $V_{in}$ varies between 90v and 130v and that the desired $V_{out}$ is 115v ± 5 percent.

Terminals 11 and 12 are shown connected to opposite ends of a primary winding 16 of a transformer T1. Numeral 17 designates the secondary winding of transformer T1. End 17a of winding 17 is shown connected to output terminal 14 while terminal 13 is connected to a junction terminal 20. The winding 17 has N taps, designated $17_1$ through $17_N$, although in FIG. 1, only taps $17_1$, $17_2$ and $17_N$ are shown. Preferably the taps are equally spaced between $17_1$ and $17_N$ so that the voltage difference between any pair of adjacent taps is equal. The number of turns of winding 17 between tap $17_1$ and the winding end 17a with respect to the number of turns of winding 16 is chosen so that when $V_{in} = 130v$, i.e., is a maximum, the voltage across end 17a and tap $17_1$ is not more and preferably less than 115v + 5 percent. Also, the total number of turns of winding 17 is chosen with respect to the number of turns of winding 16 so that when $V_{in} = 90v$, i.e., is a minimum, the voltage across winding 17 between end 17a and tap $17_N$ is not less than 115v − 5 percent.

Connected between each tap and junction terminal 20 is a separate bi-directional normally open switch. The switches are designated by S1–SN, with only switches S1, S2 and SN being shown in FIG. 1. Each switch such as S1 has a pair of enabling lines $22_1$ and $23_N$ connected thereto. The enabling lines of the other switches are designated by numerals 22 and 23 with subscripts of the switches' numeral suffixes. As will be pointed out hereafter, an enabling voltage on one of the lines, such as $22_1$, causes its associated switch, such as S1, to close and thereby connect the tap to which it is connected to terminal 13 during one half cycle of a signal, while an enabling voltage on line $23_1$ closes S1 to connect tap $17_1$ to terminal 13 during the other half of the cycle.

As is appreciated, the relationship between $V_{in}$ and $V_{out}$ in terms of the number of turns of the windings may be expressed as follows:

$$V_{out}/V_{in} = T_s/T_p$$

where $T_s$ and $T_p$ are the number of turns of the secondary and primary windings, respectively. Thus, $$V_{out} = V_{in}\, T_s/T_p.$$

In the present invention and in the present embodiment, $V_{out}$ is regulated by controlling the number of turns of the secondary winding 17 which are connected across output terminals. This is done by controlling the closure of one of switches S1 through SN so that even though $V_{in}$ varies over a range which is larger than the desired regulated range, $V_{out}$ remains within the desired regulated range. It should be pointed out that in the present invention, the change in the number of turns of the winding which is connected across the output terminals is done in discrete steps rather than continuously, thereby eliminating the mechanical devices used in the prior art regulators. As will be pointed out hereafter, the closing of any switch occurs when the voltage across it is effectively zero, thereby preventing any EMI from being generated.

As shown in FIG. 1, the novel regulator includes an AC-to-DC full wave rectifier 25 to which the output voltage $V_{out}$ is applied. The function of rectifier 25 is to convert the AC output voltage $V_{out}$ into a related DC voltage, hereafter designated $V_D$. For the particular example, in which $V_{out} = 115\text{v} \pm 5$ percent, rectifier 25 is chosen to provide the DC voltage $V_D$ which varies by $\pm 5$ percent from a nominal value as $V_{out}$ varies. For example, $V_D$ may be assumed to be equal to $+10\text{v}$ DC when $V_{out} = 115\text{v}$. Thus, as long as $V_{out}$ is held to be $115\text{v} \pm 5$ percent, $V_D = 10 \pm 5$ percent or $10\text{v} \pm 0.5\text{v}$. In accordance with the present invention, the regulation is achieved by sensing $V_D$ and controlling it to be between 10.5v and 9.5v by controlling which of switches S1–SN is closed and thereby regulating the AC voltage $V_{out}$ to be equal to $115\text{v} \pm 5$ percent.

Output lines 25a and 25b of the rectifier 25 are shown connected to a DC level-to-digital converter 27, with line 25b being shown as grounded. The function of converter 27 is to convert the amplitude of $V_D$ into a 2-bit code which is provided on output lines 27a and 27b and which is applied through a memory 29 to up-down logic 30. In the particular example, when $V_D$ is above $10 + 5$ percent, i.e., above 10.5v, the 2-bit code is represented by binary levels of 0 and 0 on lines 27a and 27b, respectively, while a 2-bit code of 1,1 on these lines indicates that $V_D$ is less than $10\text{v} - 5$ percent, less than 9.5v. A 2-bit code of 1,0 indicates that $10.5\text{v} \geq V_D \geq 9.5\text{v}$, thereby indicating that $V_D = 10 \pm 5$ percent, which occurs only when $V_{out} = 115\text{v} \pm 5$ percent, i.e., when the output voltage is within the desired regulated range. When $V_D$ is not greater than 10.5v and not less than 9.5v, it is assumed to be within a window defined by 10.5v and 9.5v.

The 2-bit code from converter 27 is stored in the memory 29 whenever the latter is strobed, as will be described hereafter, and is held therein until a subsequent strobing of the memory when the latest 2-bit code of converter 27 is stored. Thus, between strobing, the last stored 2-bit code is present in the memory and does not change even though the output of converter 27 may change. Effectively, memory 29 acts as a latching circuit.

The 2-bit code stored in the memory 29 is supplied to logic 30. The latter is clocked as will be explained hereafter and during each clock interval it uses the 2-bit code to control the count in an up-down counter 32. For an embodiment with N switches, counter 32 is an N-digit counter. The counter 32 has N output lines each of which is at a binary 1 level or simply at 1 level only when the count in the counter corresponds to the position of the line in the output line sequence. Thus, output line 1 of counter 32 is at a 1 level when the count in the counter is 1, while output line N is at a 1 level when the count in the counter is N.

Associated with counter 32 are two sets of gates, designated A and B. Each set includes N gates, with the first gate in each set being connected to output line 1 of counter 32, and each succeeding gate in each set being connected to a succeeding output line of the counter. Gates 1 through N of set A are connected respectively to enabling lines $23_1 - 23_N$, while gates 1 through N of set B are connected respectively to enabing lines $22_1 - 22_N$. The gates of set A are clocked during one half of each cycle of the input signal as will be explained hereafter. When clocked, the gate in set A, which is connected to an output line of the counter corresponding to the count in the counter, provides an enabling signal to the switch to which it is connected. Similarly, the gates of set B are clocked during the other half of each cycle so that the gate connected to an output line of the counter which is at a 1 level provides an enabling signal to its corresponding switch. Thus, during each half of each cycle, one of the switches is enabled to connect the tap to which it is connected to output terminal 13, through junction terminal 20.

As seen from FIG. 1, the input voltage $V_{in}$ is applied to a clock 35 which in practice is a zero crossing detector. It converts the sinusoidal input voltage into a square wave with the transitions occurring at the points of zero crossing, i.e., when the amplitude of the input voltage is zero. The square wave output of the clock 35 on line 36 is designated $\phi A$ and its complement, designated $\phi B$, is provided on line 37 by inverter 38. Both logic 30 and the gates of set A are assumed to be clocked by the positive transitions of $\phi A$, while the gates of set B are clocked by the positive transitions of $\phi B$. Also a one-shot 39 is activated by the positive transitions of $\phi B$. The one-shot provides short duration pulses which strobe the memory 29 to store the 2-bit code from converter 27.

The operation of the foregoing described circuitry may best be explained in connection with FIG. 2 and a specific example. In FIG. 2, line a represents the sinusoidal waveshape of the input voltage $V_{in}$, and lines b and c are the waveshapes of the two square waves $\phi A$ and $\phi B$, whose transitions occur when the amplitude of $V_{in}$ is zero. The upper level of each square wave is designated as a 1 level and the lower level as the 0 level. Clocking is assumed to take place by the positive transitions (the 0-to-1 level changes) of $\phi A$ which occur at odd times $t_1, t_3, t_5$, etc., and during the positive transitions (0-to-1 level changes) of $\phi B$ which occur during even times $t_0$, $t_2$, $t_4$, etc. At each of these times, one-shot 39 is activated to produce a short duration pulse, designated by numerals 40 in line $d$ of FIG. 2.

In the described embodiment, the levels on output lines 30a and 30b of logic 30, which are respectively connected to the DOWN and UP inputs of counter 32 depend on the 2-bit code received from memory 29 and the level of the clock $\phi$A which is applied to the logic 30. When the clock level is a 0, such as between $t_0$ and $t_1$, $t_2$ and $t_3$, etc., both lines 30a and 30b are at a 1 level. Under such conditions, the count in the counter does not change. For the counter to be decremented by one, a 1 level must appear on line 30b and line 30a must go through a 0-to-1 transition. Similarly, for the count to be incremented by one, line 30a must be at a 1 level and line 30b must go through a 0-to-1 level transition.

In the present example, when the rectified voltage exceeds its upper limit of $10 + 0.5 = 10.5v$, the 0,0 2-bit code of converter 27, is stored in memory 29. The stored 0,0 code is supplied to the logic 30 on output lines 29a and 29b of the memory. Since line 29b is at a 0 level, the output of logic 30 on line 30b is a 1, regardless of $\phi$A. However, since line 29d is at a 0 level upon being clocked by $\phi$A, logic 30 produces a 0-to-1 transition on line 30a. Thus, the counter is decremented by one and consequently, during the next cycle of the input signal, a switch with a numerical suffix smaller by one than the previously closed switch is closed, thereby reducing the AC voltage across the output terminals. On the other hand, if the rectified voltage $V_D$ is below its lower limit of 9.5v, i.e., the output voltage is less than 115v − 5 percent, the 1,1 code from converter 27 stored in memory 29 causes the logic 30 to provide a level 1 on line 30a and upon being clocked by $\phi$A produces a 0-to-1 transition on line 30b. Consequently, the counter is incremented by one and therefore during the next cycle, a larger portion of winding 17 is connected across the terminals 13 and 14 thereby increasing the voltage thereacross.

However, when $V_D$ is within the window, i.e., is not greater than 10.5v or smaller than 9.5v, the 1,0 code from converter 27, which is stored in memory 29 causes logic 30 to provide a 1 level on each of lines 30a and 30b, irrespective of $\phi$A. Thus, the count in counter 32 is inhibited from changing. The levels on the various lines and their effects are summarized in the following table.

the memory is strobed by pulse 40 formed at $t_0$. During $t_1 - t_0$, $\phi$A is at a 0 level and therefore both output lines of logic 30 are at a 1 level as represented by lines 42 and 43 in lines $e$ and $f$ of FIG. 2. At time $t_1$, when $\phi$A changes from 0 to 1, line 30a changes from 1 to 0, as represented by numeral 44. However, line 30b remains at the level 1 level as indicated by line 43. At $t_2$, when $\phi$A changes from 1 to a 0, line 30a changes from 0 to 1, as indicated by numeral 45. This 0 to 1 transition on line 30a and the presence of a 1 on line 30b causes the counter to decrement by one. Thus, its count changes from four to three, and therefore output line 3 of counter 32 is at a 1 level. Between $t_2$ and $t_3$, $\phi$B is at a 1 level and therefore gate 3 in set B, which is closed by $\phi$B, is enabled to provide an enabling signal to S3 via line $23_3$. Thus, S3 is closed, as represented by numeral 47 in line $g$ of FIG. 2. Consequently, the portion of winding 17, which is connected across terminals 13 and 14 is smaller than the winding portion previously connected with switch S4 was closed when the count in the counter was four. As a result, the maximum voltage across terminals 13 and 14 is smaller. The enabling signal on line $23_3$ closes switch S3 to enable current to flow therethrough in a direction so that voltage builds up across the output terminals 13 and 14 in response to the negative half cycle of cycle C1.

Between time $t_3$ and $t_4$ when $\phi$A is at a 1 level the gates in set A are enabled. Since output line 3 of counter 32 is at a 1 level, gate 3 in set A provides an enabling signal on line $22_3$. Thus, S3 remains enabled during $t_4 - t_3$, as represented by numeral 48 in FIG. 2. When gate S3 is enabled by the signal on line $22_3$, current flows through the gate to enable the voltage across terminals 13 and 14 to build up in response to the positive half cycle of C1.

Assuming that at time $t_2$ the voltage $V_D$ is still greater than 10.5v, the 2-bit code from the converter 27 is still 0,0 and therefore, the 0,0 2-bit code is stored in memory 29 at $t_2$. At $t_3$, when $\phi$A changes to a 1, the level at line 30a changes to a 0, as represented by numeral 51 in FIG. 2. However, line 30a remains at a 1 level. At $t_4$, when $\phi$A changes from 1 to a 0, line 30a changes from a 0 to a 1 level, as represented by numeral 52. Thus, the counter 32 is again decremented by one. That is, its count changes from three to two. Consequently, switch S2 is enabled during $t_6 - t_4$, as represented by numeral 53 in line $h$ of FIG. 2. This process

TABLE

| $V_D$ | LINE 29a | LINE 29b | $\phi$A | LINE 30a | LINE 30b | EFFECT ON COUNTER 32 |
|---|---|---|---|---|---|---|
| $V_D > 10.5$ | 0 | 0 | 0/1 | 1/0 | 1/1 | Count decremented by one when 30a changes from 0 to 1 |
| $10.5 \geq V_D \geq 9.5$ | 1 | 0 | 0/1 | 1/1 | 1/1 | Count unchanged |
| $V_D < 9.5$ | 1 | 1 | 0/1 | 1/1 | 1/0 | Count incremented by one when 30b changes from 0 to 1 |

Referring again to FIG. 2, let it be assumed that prior to $t_0$, the count in the counter is four and that $V_D > 10.5$, i.e., the output voltage is greater than $115 \pm 5$ percent. Under these conditions, converter 27 provides a 0,0 code which is stored in the memory 29 at $t_0$ when continues until $V_D$ is within the window of 10.5v and 9.5v which occurs when $V_{out} = 115v \pm 5$ percent. Under these conditions, the count in the counter does not change and therefore the same switch is enabled during each half cycle of the input voltage.

Similarly, if $V_D$ is less than 9.5v, the 2-bit code of converter 27 is 1,1. It is stored in the memory 29 when the latter is strobed by a strobe pulse 40. Since line 29a is at a 1 level, output line 30a of logic 30 is at a 1 irrespective of the clock $\phi A$. However, output line 30b switches from 0 to 1 when $\phi A$ changes from 1 to 0. Thus, the counter is incremented by one, e.g., from three to four. Thus, during the next cycle of the input signal, S4 rather than S3 is closed, thereby connecting a greater portion of the secondary winding 17 across output terminals 13 and 14. Consequently, the amplitude of the output voltage increases. The counter is repeatedly incremented by one during each succeeding cycle of the input signal until $V_D$ is not less than 9.5v, which occurs when $V_{out}$ is within the desired regulation range.

Figure 3:
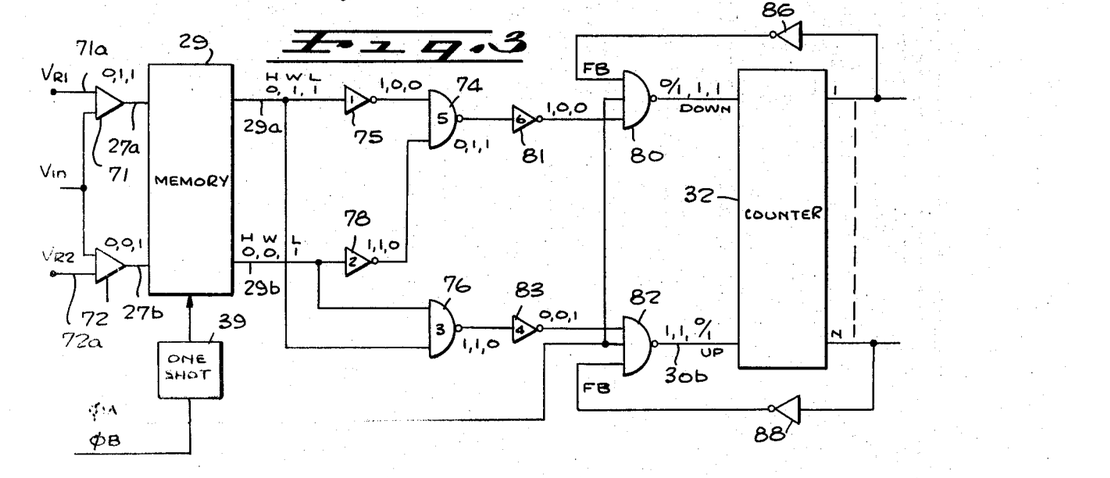
FIGS. 3 and 4 are more detailed diagrams of circuitry shown in FIG. 1.

Attention is now directed to FIG. 3, which is a more detailed diagram of the converter 27 and the up-down logic 30. In one embodiment, converter 27 comprises a pair of amplifiers 71 and 72. In amplifier 71, the rectified voltage $V_D$ from rectifier 25 is compared with a reference voltage $V_{R1}$, which is applied at terminal 71a and which in the particular example, is 10.5v. The output of the amplifier 71, on output lines 27a is at a 1 level as long as $V_D$ is not greater than $V_{R1}$. Only when $V_D$ is greater than $V_{R1}$, is the output of amplifier 71 on line 27a at a 0 level. Similarly, amplifier 72 compares the rectified voltage $V_D$, with a reference voltage $V_{R2}$, which in the present example is 9.5v and which is applied at terminal 72a. The output of amplifier 72 on output line 27b is at a 0 level as long as $V_D$ is not less than $V_{R2}$. However, the level changes to 1 whenever $V_D$ is less than $V_{R2}$. In FIG. 3, the three numerals considered from left to right, adjacent to each one of the lines, designate the levels of the lines for the three conditions in which $V_D$ is higher than the desired range, is within the desired range of 9.5v to 10.5v i.e., is within the window, or is below the lower level of 9.5v.

As previously explained and shown in FIG. 3, the levels on lines 27a and 27b are stored in memory 29 whenever the latter is strobed by a pulse 40 produced by the one-shot 39, and are held in the memory until the memory is subsequently strobed. Thus, even though the output levels of the amplifiers 71 and 72 may change, the output levels of the memory remain constant between strobing pulses. Output lines 29a of the memory 29 is shown connected to one input of a NAND gate 74 through an inverter 75 as well as to one input of a NAND gate 76. Similarly, the output line 29b of memory 29, is connected to the other input of NAND gate 76 as well as to the other input of NAND gate 74 through an inverter 78. The output of inverter 74 is connected to one input of a NAND gate 80 through an inverter 81 while the output of NAND gate 76 is connected to one input of a NAND gate 82 through an inverter 83. Each of NAND gates 80 and 82 has one input connected to the clock 35 on which $\phi A$ is applied. Each of the NAND gates 80 and 82 has a third input, which will be described hereafter. However, for the present, it may be ignored and it may be assumed that a 1 level is impressed thereon.

From the foregoing, it should be appreciated that when $V_D$ is greater than $V_{R1}$, i.e., the output voltage $V_{out}$ exceeds its upper limits, the output levels of amplifiers 71 and 72 are both at a 0 level. Consequently, the outputs of inverters 81 and 83, which are respectively applied to NAND gates 80 and 82, are the 1 and 0 levels, respectively. The 0 level applied to NAND gate 82 in effect disables the gate so that its output on output line 30b is a 1 irrespective of the level of $\phi A$. As far as NAND gate 80, whose output line is 30a, which is applied to the counter, the level on said line depends on the level of $\phi A$. When the latter is at a 0 level, the output of NAND gate 80 is a 1. However, when the level of the $\phi A$ is at a 1, all the inputs to NAND gate 80 are 1 and therefore its output is 0. As a result, when $\phi A$ changes from a 1 level to a 0 level, the output level of NAND gate 80 changes from a 0 to 1 and therefore, in the particular example, the count in the counter is decremented by 1, as previously explained.

When $V_D$ is within the desired limits, i.e., $V_D$ is not greater than $V_{R1}$ and is not less than $V_{R2}$, the output levels of amplifiers 71 and 72 are 1 and 0, respectively. Consequently, the outputs of both inverters 81 and 83 are 0's. Therefore, the outputs of both NAND gates 80 and 82 on output lines 30a and 30b, respectively are 1 irrespective of the level of $\phi A$. Consequently, the count in counter 32 is neither incremented nor decremented and remains at the previous count stored therein. Therefore, the switch which is enabled during each cycle of the input signal is not changed.

On the other hand, when $V_D$ is less than $V_{R2}$, which occurs when the output voltage is below the minimum regulated level of a 115v – 5 percent and therefore $V_D$ is less than 9.5v, the outputs of amplifiers 71 and 72 are both at a 1 level. Consequently, the output of inverter 81 is at a 0 level, thereby disabling the NAND gate 80 from responding to the changes of the level $\phi A$ and thereby causing output line 30a to be at a 1 level. On the other hand, the output of inverter 83 is a 1. Consequently, the output level of NAND gate 82 on output line 30b changes from a 0 level to a 1 level whenever the level $\phi A$ changes from a 1 level to a 0 level, respectively. As a result, the count in the counter is incremented by 1.

As shown in FIG. 3, NAND gate 80 is also connected to output line 1 of the counter 32 through an inverter 86. The purpose of this connection is to inhibit the counter from being decremented when the lowest count, i.e., a 1 count is stored therein. This is necessary in order to insure that the count in the counter is not decremented below its lowest count which is a 1. As long as the count in the counter is other than a 1, output line 1 of the counter is at a 0 level and therefore the output of inverter 86 which is applied to NAND gate 80 is a 1. Consequently, NAND gate 80 is not disabled. However, when the count in counter 32 is a 1, output line 1 is at a 1 level and therefore the output of inverter 86 is at a 0 level. Consequently, the output of NAND gate 80 is a 1, irrespective of the levels on the other input lines. This inhibits the output line 30a from changing between 0 and 1 levels, and thereby inhibits it from applying decrementing pulses to the counter.

Similarly, output line N of counter 32 is connected to one input of NAND gate 82 through an inverter 88. When the count in the counter 32 is other than N, output line N is at a 0 level. Consequently, the output of inverter 88 is a 1. However, when the count in the counter 32 is N, output line N is at a 1 level and therefore the output of inverter 88 is a 0. As a result, NAND gate 82 is disabled so that its output on line 30b is at a 1 level, irrespective of the changes of the level of $\phi A$. Thus, incrementing pulses are inhibited from being supplied to the counter.

Figure 4:
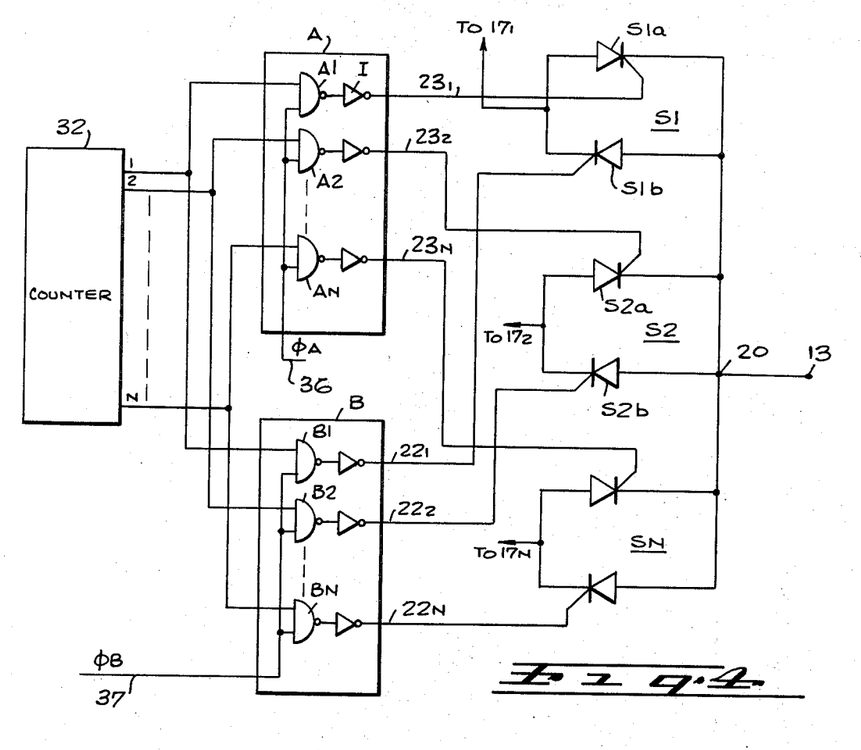

Attention is now directed to FIG. 4 in which the connections between the counter 32, the sets of gates A and B and the various switches are shown in greater detail. As seen, output line 1 of counter 32 is connected to one input of a NAND gate A1 which is included in set A, whose other input is connected to line 36 at which clock $\phi A$ is applied. The output of NAND gate A1 is connected through an inverter, generally designated by I, to the gate terminal of a silicon controlled rectifier (SCR) designated S1$a$, which together with a second SCR S1$b$ comprises the bi-directional switch S1, previously referred to. The anode and cathode of SCRs S1$a$ and S1$b$ are respectively connected to the tap $17_1$ while the cathode and anode of the last mentioned SCRs are connected to the common junction terminal 20. Similarly, the output line 1 of the counter 32 is connected to one input of a NAND gate B1 which forms part of set B. The other input of B1 is connected to line 37 at which $\phi B$ is applied. The output of NAND gate B1 is connected through inverter I to the gate terminal of SCR S1$b$.

In operation, when the count in the counter 32 is 1 and output line 1 is assumed to be at the 1 level and when $\phi A$ is at the 1 level, the output of NAND gate A1 is 0 and therefore the output of interter I is a 1. Consequently, SCR S1$a$ is triggered, thereby enabling current to flow between its anode and cathode. Thus, current flow from tap $17_1$ to junction terminal 20 and therefrom to output terminal 13 is accomplished. Similarly, when the count in counter 32 is a 1 and output line 1 is at level 1, and $\phi B$ is at the 1 level, NAND gate B1 provides a 0 output which is inverted by inverter I so that the level on line $22_1$ which is connected to the gate of S1$b$ is a 1. Thus, SCR S1$b$ is triggered to enable current to flow between its terminal 13 and tap $17_1$ and output terminal 13 and thereby enable the AC voltage to be built up between terminal 13 and the other output terminal 14, which is connected to the end 17$a$ of the secondary winding 17.

Each of the other output lines of the counter is similarly connected to one gate in set A and one gate in set B, and each of the switches S2–SN comprises a pair of SCRs, whose operation should be apparent from the foregoing description. Therefore, their operation will not be described in further detail.

It should be stressed that in the present invention each SCR is triggered when either $\phi A$ or $\phi B$ changes from 0 to 1. This occurs when the input voltage is zero since $\phi A$ and $\phi B$ are formed by the zero-crossing detector 35. Thus, each SCR is triggered when the voltage across its anode to cathode path is essentially zero. Such an arrangement eliminates any EMI from being generated. It should further be pointed out that in the present invention, a one cycle delay is present. For example, as previously explained in connection with FIG. 2, the counter is decremented by one at $t_2$ based on the 2-bit code stored in the memory at $t_0$. Similarly, the counter is decremented by one at $t_4$ based on the 2-bit code stored in the memory 29 at time $t_2$.

It should be pointed out that although in FIG. 3, each switch is shown comprising of two back-to-back SCRs with two separate enabling lines, each switch can be replaced by a thyristor which is a bi-directional switch with a single enabling line. Such use would eliminate the need of one of the sets of gates and the set of the N enabling lines extending therefrom.

Based on the foregoing, the described embodiment may be summarized as comprising an AC voltage regulator in which the AC output voltage $V_{out}$ is regulated to be within a defined range by monitoring it and varying the portion of the secondary winding which is connected across the output terminals in discrete steps so that $V_{out}$ is maintained within the desired range. Recalling that $$V_{out} = V_{in}\, T_s/T_p$$

in the present embodiment, it can be stated that $V_{out}$ is regulated by varying $T_s$ in discrete steps as $V_{in}$ varies so that the product of $V_{in}$ and $T_s/T_p$ is within the desired voltage range. Any change in the outwinding portion connected across the output terminals can only occur once per cycle of the input signal.

In the foregoing described embodiment, $T_p$, i.e., the number of turns of the primary winding 16 is constant and $T_s$ is varied. Clearly, if desired $T_s$ may be held constant and $T_p$ changed in discrete steps as herebefore described. In such an arrangement, terminals 13 and 14 would serve as the input terminals and terminals 11 and 12 would serve as the output terminals across which the desired regulated output voltage $V_{out}$ would be produced. The output voltage across terminals 11 and 12 would be applied to rectifier 25. Either the input or output voltage can be applied to the clock or zero-crossing detector 35 to provide the clocking phases $\phi A$ and $\phi B$.

Figure 5:
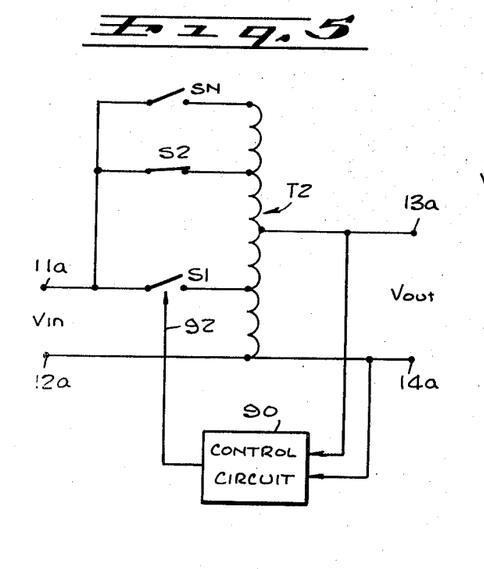
FIGS. 5, 6, and 7 are diagrams of additional embodiments of the invention.

If isolation between input and output is not required, instead of a two-winding transformer, an autotransformer may be employed, such as is shown in FIG. 5 which is a simplified diagram in which the autotransformer is designated by T2. As is known, an autotransformer consists of a single winding. However, the single winding performs functions analogous to those performed by separate windings of an isolation transformer. Therefore for explanatory and definition purposes, the autotransformer can be thought of as comprising two separate windings. In FIG. 5, control circuit 90 is assumed to include all the circuitry shown in FIG. 1, except for the transformer and the switches. Arrow 92 represents the connection between the various gates in sets A and B and the switches S1–SN, which in FIG. 5 are represented in simplified form as normally open single-throw switches. Also, to exemplify the various applications of the present invention, the switches are shown on the input side of the autotransformer T2 rather than on the output side, as previously described. At any time, one of the switches such as S2 is closed to thereby connect the input terminals 11 and 12 across a portion of transformer winding.

Figure 6:
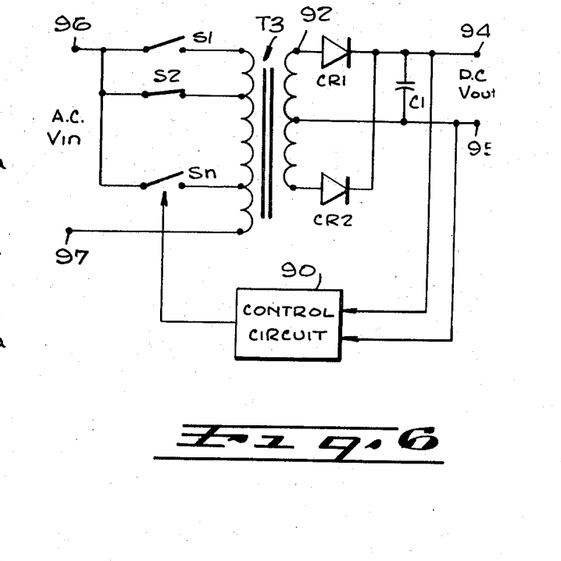

As previously briefly indicated, the present invention is not limited to AC voltage regulation, and is equally applicable to DC voltage regulation. It may find particular application to obtain maximum efficiency as a low DC output voltage regulator. One simplified embodiment of such a regulator is shown in FIG. 6. Therein, the input and output are isolated from one another by transformer T3. The secondary winding 92 is connected to a pair of diodes CR1 and CR2 and center-tapped to provide a DC output voltage across capacitor C1 which is connected across output terminals 94 and 95. It is apparent to those familiar with the art that the winding 92 and the diodes act as a fullwave rectifier of the AC input voltage at input terminals 96 and 97 which is applied across the primary winding 98. Defining the DC output voltage as $V_{DC}$ and the input voltage $V_{in}$, it is clear that $V_{DC}$ is directly related to $V_{in} T_s/T_p$, where $T_p$ and $T_s$ are the number of turns of the secondary and primary windings, 92 and 98, respectively. In this embodiment, $T_p$ rather than $T_s$ is controlled to regulate $V_{DC}$ by controlling which of switches Sl through SN is closed. In FIG. 6, the control circuit 90 does not include the rectifier 25 since the output voltage is DC and, therefore, it can be used directly as the control input voltage $V_D$ to amplifiers 71 and 72.

Figure 7:
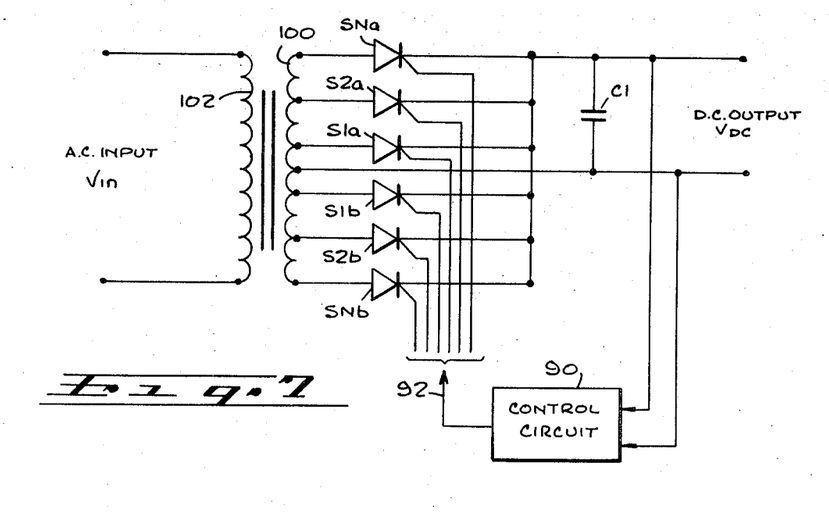

If desired, the function of the switches Sl–SN and the rectifying diodes CR1 and CR2 may be combined by an arrangement as shown in FIG. 7. Therein, DC output voltage regulation is accomplished by controlling the number of turns of the secondary winding 100 which are connected in the full wave rectification arrangement, thereby controlling the DC output voltage. The number of turns of the primary winding 102 across which the unregulated AC input voltage is applied is held constant. In FIG. 7, SCRs S1a and S1b, S2a and S2b and SNa and SN6 act as swithces S1, S2 and SN, respectively, herebefore described in connection with FIG. 4. In addition, however, when closed they serve as the rectifying diodes CR1 and CR2, as shown in FIG. 6. The gate terminals of these SCRs are connected to the control circuit as shown in FIG. 4 and as represented in simplified form by arrow 92 in FIG. 7.

Figures 8, 9:
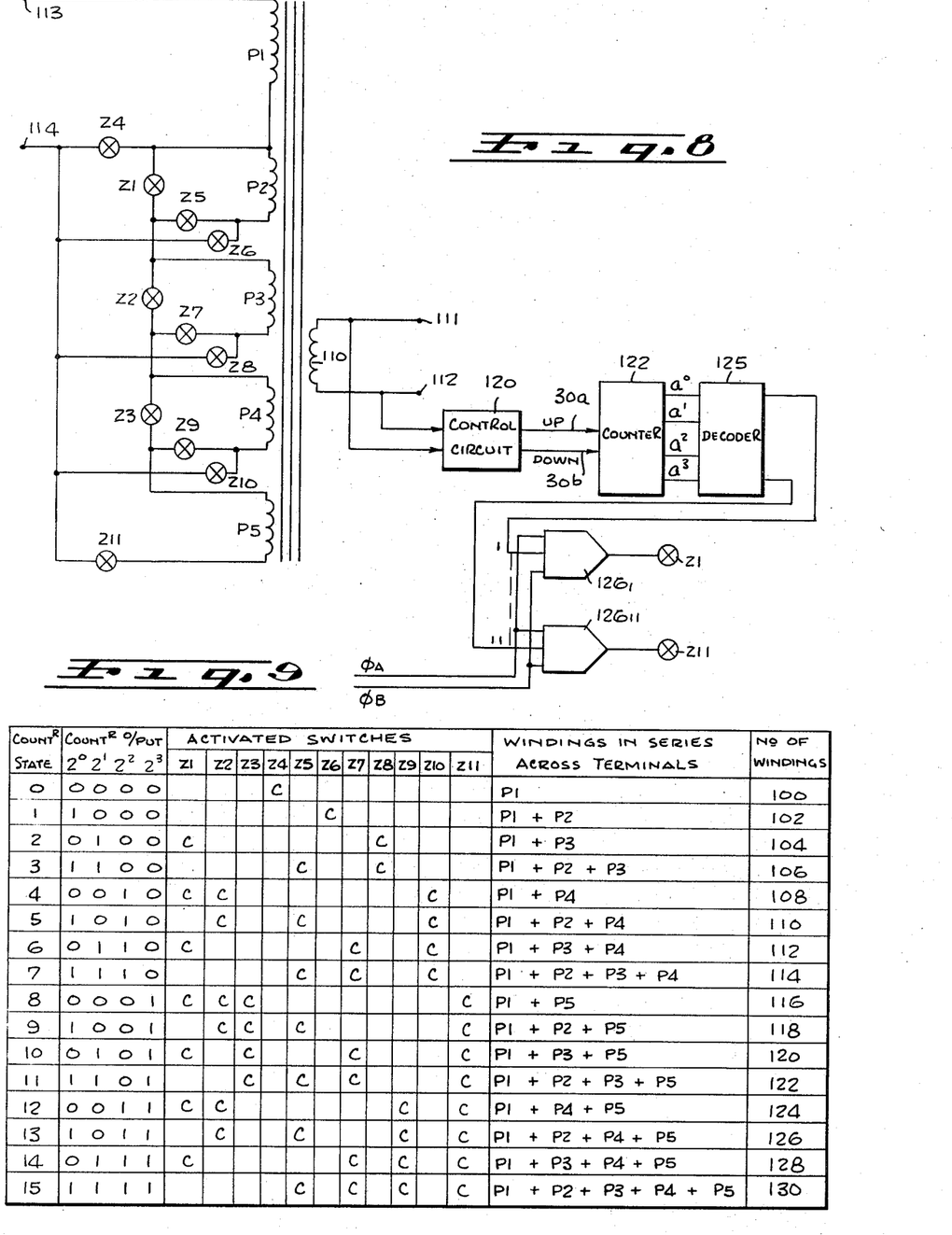
FIG. 8 is a diagram of another embodiment of the invention.
FIG. 9 is a truth table useful in explaining the embodiment of FIG. 8.

In each of the foregoing described embodiments, only one switch is closed for each state or count of the control counter. In another embodiment of the invention at the price of some efficiency voltage regulation may be achieved with a reduced number of switches. This embodiment may best be described in connection with FIGS. 8 and 9. FIG. 8 is a diagram of a transformer T4 with a plurality of primary windings P1–P5 and a signal secondary winding 110 shown connected across terminals 111 and 112 which for explanatory purposes are assumed to be the output terminals. Associated with the primary windings P1–P5 are 11 switches Z1–Z11 and terminals 113 and 114 which are assumed to be the input terminals. The switches which may be triacs, are used to control which of the primary windings P2–P5, if any, are connected in series with winding P1 across the input terminals 113 and 114. As will be pointed out the 11 switches are capable of controlling the number of turns across the input terminals in 16 steps whereas in the prior embodiments 16 switches are needed for such control.

Just like the prior embodiments, the output voltage across terminals 111 and 112 is monitored by the control circuit 120 to control the count in the counter which is designated in FIG. 8 by numeral 122. For a 16-step control, the possible number of counter states is 16 so that a 4-bit counter can be employed. The counter count or state is represented in binary coded decimal (BCD) on the four counter output lines, designated $2^0$, $2^1$, $2^2$, and $2^3$. These lines are connected to a decoder 125 with 11 output lines connected to 11 drives $126_1$ – $126_{11}$ associated with switches Z1–Z111, respectively. In FIG. 8, only drivers $126_1$ and $126_{11}$ are shown.

A driver is enabled during the clocking phases $\phi A$ and $\phi B$ only when the decoder output line connected thereto is enabled. Which of the latter lines are enabled depends on the counter state. The decoder operation is summarized in the truth table of FIG. 9, for a specific example. Therein it is assumed that in counter state 0, only output line 4 of decoder 125 is enabled, as represented by the letter c and therefore only switch Z4 is closed and all the other switches remain open. Thus, only P1 is connected across input terminals 113 and 114. On the other hand, in counter state 15, output lines 5, 7, 9, and 11 are enabled and therefore only switches Z5, Z7, Z9, and Z11 are closed. Consequently, all five windings P1–P5 are connected in series across the input terminals. The windings which are connected in series across the input terminals for each counter state are listed in the second column from the right of FIG. 9.

The number of turns of windings P2–P5 are chosen so that in the particular embodiment as the counter count increases, the number of turns connected across the input terminals increases. For example, assuming for explanatory purposes only that the number of turns of P1 is 100 and those of P2–P5 are 2, 4, 8, and 16, respectively, it should be apparent that in the embodiment of FIG. 8, the number of turns across the input terminals increases from 100 to 130 in two turns per step increments. The number of turns per counter state are listed in the right hand column of FIG. 9.

From the foregoing, it is thus seen that in the last described embodiment, changing the number of turns across the input terminals in 16 discrete steps is accomplished with only 11 switches rather than 16. Also, the number of transformer taps is reduced. However, to achieve these advantages, decoder 125 is required. Also, efficiency is lowered since in some counter states up to four switches are activated simultaneously thereby increasing the power loss, as compared with a single activated switch for each counter state.

It should be apparent that although in describing the last embodiment it was assumed that terminals 111 and 112 and 113 and 114 are the output and input terminals, respectively, their functions may be reversed. In such a case, the output voltage across terminals 113 and 114 serving as output terminals will be applied to the control circuit 120. In the particular example, the change in the number of turns from one counter state to the next is two. However, the percentage change is not the same. For example, when changing from 100 turns (counter state 0) to 102 turns (counter state 1), the percentage change is about 2. However, when changing from 128 turns (counter state 14) to 130 turns (counter state 15), the percentage change is closer to 1.54. If desired, the number of turns of the various windings P1–P5 may be chosen to maintain a substantially constant percentage change of the turns connected in series from one counter state to the next.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A voltage regulator for providing an output voltage regulated to be within a selected range in response to an unregulated input voltage applied thereto, comprising:

a pair of input terminals at which said input voltage definable as $V_{in}$ is appliable;

a pair of output terminals across which said output voltage definable as $V_{out}$ is to be produced;

transformer means comprising at least one multiturn winding;

connecting means for connecting said pairs of terminals to said winding with the number of turns across said input terminals being definable as $T_p$ and the number of turns across said output terminals being definable as $T_s$, said connecting means including switch means for varying either $T_p$ or $T_s$ in discrete steps with $V_{out}$ being related to $V_{in}$ times $T_s$ over $T_p$;

converter means coupled to said output terminals and responsive only to first and second reference potentials and to the voltage across said output terminals or a voltage related thereto for providing respectively first, second and third digital outputs when the voltage across said output terminals or a voltage related thereto exceeds said first reference potential, is neither greater than said first reference potential nor less than said second reference potential, and is less than said second reference potential, said converter means having a pair of output lines, each at either a first binary level or a second binary level, with each of said digital outputs being represented by the combination of the binary levels of said pair of output lines;

logic and counting means coupled to said converter means and including an up-down counter for respectively decrementing the counter count by one, maintaining the counter count constant, and incrementing the counter count by one in response to said first, second and third outputs; and control means coupled to said counter and to said switch means of said connecting means for controlling said switch means to vary either $T_p$ or $T_s$ as a function of the count in said counter.

2. The voltage regulator as described in claim 1 wherein said transformer means is a single winding autotransformer.

3. The voltage regulator as described in claim 1 wherein the unregulated input voltage is an alternating-current (AC) input voltage which varies above and below a reference level and said regulator further includes clock means responsive to said input voltage for providing clocking pulses when the amplitude of said input voltage croses said reference level, and means for applying said clocking pulses to said control means to control said switch means to vary either $T_p$ or $T_s$ when the amplitude of said input voltage is substantially at said reference level.

4. The voltage regulator as described in claim 1 wherein said transformer means includes a first multiturn winding and a separate second multiturn winding with said connecting means directly connecting either said input terminals or said output terminals to said first winding, with the pair of terminals not directly connected to said first winding being controllably connected through said switch means to said second winding with the number of turns of said second winding connected across said pair of terminals being a function of the count in said counter.

5. The voltage regulator as described in claim 4 wherein said connecting means connect said input terminals across $T_p$ turns of said first winding and one end of said second winding to one of said output terminals, said second winding including a plurality of taps and the switch means of said connecting means comprise a plurality of triggerable switches each having one end connected to a different one of said taps and another end to a common junction terminal, means connecting said other output terminal to said common junction terminal, and means connecting said switches to said control means whereby the latter closes a selected one of said switches, the selected switch being a function of the count in said counter so that when a switch is closed, the number of turns of the second winding between the tap to which the closed switch is connected and the end of the second winding connected to one of said output terminals is connected across said output terminals.

6. The voltage regulator as described in claim 5 wherein said input voltage is an alternatingcurrent (AC) voltage which varies above and below a reference level, and said regulator includes means responsive to said input voltage for controlling said control means to close the selected switch only when said input voltage amplitude is substantially equal to said reference level and the voltage across the closed switch is substantially zero.

7. The voltage regulator as described in claim 4 wherein said connecting means connect said first winding of $T_s$ turns across said output terminals and one end of said second winding to one of said input terminals, said second winding including a plurality of spaced apart taps and the switch means of said connecting means include a plurality of switches each having one end connected to a different one of said taps and another end to a common junction terminal, means connecting said other input terminal to said common junction terminal, and means for connecting said switches to said control means, the latter closing a selected one of said switches as a function of the count in said counter so that the number of turns of the second winding between the tap to which the closed switch is connected and the end of the second winding connected to one of said input terminals is connected across said input terminals.

8. The voltage regulator as described in claim 7 wherein said input voltage is an alternatingcurrent (AC) voltage which varies above and below a reference level, and said regulator includes means responsive to said input voltage for controlling said control means to close the selected switch only when said input voltage amplitude is substantially equal to said reference level and the voltage across the closed switch is substantially zero.

9. A voltage regulator for providing an alternating-current (AC) output voltage regulated to be within a selected range in response to an unregulated AC input voltage which varies in amplitude above and below a zero reference level, comprising:

input terminals at which said input voltage is applicable;

a transformer having a first multiturn winding and a second separate multiturn winding;

a pair of output terminals across which said output voltage is produced;

first means for fixedly connecting either said input terminals or said output terminals directly to said first winding;

second means for variably connecting the second winding to the pair of terminals not connected to said first winding to vary the number of turns of the second winding connected across said pair of terminals;

converting means responsive only to the output voltage across said output terminals for providing first, second and third digital output signals when said output voltage is above said selected range, within said selected range and is below said selected range, respectively, said converter means having a pair of output lines, each at either a first binary level or a second binary level, with each of said digital output signals being represented by the combination of the binary levels of said pair of output lines; and control means including an up-down counter and responsive to each output signal of said converting means for controlling the count in the counter as a function of said output signals, and means for controlling said second means to vary in discrete steps the number of turns of said second winding connected to the terminals which are not connected across said first winding as a function of the count in said counter, so that for each counter count, a different number of turns of said second winding is connected across said terminals which are not connected to said first winding.

10. The voltage regulator as described in claim 9 wherein said second means include a plurality of triggerable switches, said second winding including a plurality of taps, with the number of turns of said second winding between adjacent taps being substantially equal, with each switch being connected between one of said taps and a common junction point, said control means including means for triggering a selected one of said switches as a function of the count in said counter, and clock means for controlling said control means to trigger the selected switch when the amplitude of said input voltage is substantially equal to said zero reference level, and the potential difference across the selected switch is substantially equal to zero.

11. The voltage regulator as described in claim 10 wherein each of said switches is a solid state device for providing a low resistance path between its ends connected to one of said taps and said common junction point when triggered by said control means, whereby the number of turns of the second winding connected across the terminals not connected to said first winding varies in discrete steps as different ones of said switches are triggered when the count changes in said counter from one count to another.

12. An alternating-current (AC) to direct current (DC) voltage regulator for providing in response to an AC input voltage, varying about a zero reference level, a DC output voltage regulated to be within a selected range, comprising:

a pair of input terminals across which said input voltage is applied;

a transformer having a first multiturn winding and a second multiturn winding with a center tap and a first group of taps substantially equally spaced from said center tap to one end of said second winding, and a second group of taps substantially equally spaced from said center tap toward the other end of said second winding, whereby the number of turns between adjacent taps in each group is substantially equal;

first means connecting said input terminals across said first winding;

first and second output terminals;

means connecting said center tap to said second output terminal;

switch means connected between said first and second groups of taps and said first output terminal;

a capacitor connected across said output terminals;

means responsive to the voltage across said output terminals for providing first, second, and third digital output signals when the output voltage across said output terminals, exceeds said selected range, is within said selected range, and is below said selected range, respectively, said converter means having a pair of output lines, each at either a first binary level or a second binary level, with each of said digital output signals being represented by the combination of the binary levels of said pair of output lines;

an up-down counter responsive to each of said digital output signals for varying the count in the counter in first and second opposite directions in response to said first and third outputs respectively, and for maintaining the count in the counter constant in response to said second output; and control means coupled to said counter and said switch means for enabling said switch means during each half of each cycle of the input voltage to connect a selected tap in said first group to said first output terminal and for enabling said switch means during the other half of each cycle of the input voltage to connect a selected tap in said second group to said first output terminal, the selected taps being a function of the count in said counter.

13. An alternating current (AC) to direct current (DC) voltage regulator as described in claim 12 wherein said switch means comprises a plurality of triggerable solid state switches, each connected between one of said taps and said first output terminal, each switch providing a low resistive path between its ends when triggered, with said control means triggering a selected switch connected to a tap in said first group during the first half of each input voltage cycle and a selected switch connected to a tap in said second group during the other half of each input voltage cycle.

14. An alternating current (AC) to direct current (DC) voltage regulator as described in claim 13 further including clock means responsive to said input voltage for controlling said control means to trigger the selected switches when the input voltage amplitude is substantially zero whereby the voltage across any switch when triggered is substantially zero.

15. A voltage regulator comprising:

transformer means including N separate multiturn primary windings and a single multiturn secondary winding, N being an integer greater than one;

input terminals at which an input voltage definable as $V_{in}$ is applicable;

output terminals at which an output voltage definable as $V_{out}$ is to be produced with an amplitude between preselected upper and lower amplitude limits;

first connecting means for directly connecting said secondary winding across either said input terminals or said output terminals;

second connecting means including actuatable switch means for selectively connecting one or more selected ones of said N separate primary windings in series across the terminals which are not connected to said secondary winding;

first control means including an up-down counter coupled to said output terminals for controlling the count in said counter as a function of the output voltage amplitude with respect to said upper and lower limits, said first control means including means for providing any one of three digital outputs, each being represented by a different combination of two binary levels, and means for controlling the count in the counter with said digital outputs; and second control means coupled to said counter and to said switch means for actuating said switch means so as to select the primary windings connected in series across the terminals not connected across said secondary winding as a function of the count in said counter, with the number of turns of the windings connected in series being different for each counter state, increasing when the count of the counter changes in a first direction and decreasing when the count of the counter changes in a second direction.

16. The voltage regulator as described in claim 15 wherein each of said primary windings has a different number of turns, and said switch means comprises a plurality of switches, with different combinations of one or more of said switches being actuated as a function of the count of said counter.

17. The voltage regulator as described in claim 16 wherein the number of said switches is less than the number of the different counts of said counter.

18. The voltage regulator as described in claim 17 wherein said second control means include means for actuating any of said switches only when the voltage thereacross is substantially zero.

19. The voltage regulator as described in claim 18 wherein the number of turns of a first one of said primary windings is greater than the total number of turns of the rest of said primary windings.

20. The voltage regulator as described in claim 19 wherein said switches interconnect said primary windings with said terminals which are not connected to said secondary winding so that at a first count of said counter representing one end of the count range only said first one of said primary windings is connected across said terminals and at a second count of said counter representing the opposite end of said count range all of said N primary windings are connected in series across said terminals.

* * * * *